(No Model.)

A. R. OLIVER.
OPERATING MECHANISM FOR SLIDING GATES.

No. 593,116. Patented Nov. 2, 1897.

WITNESSES
H. N. Jenkins
William Ball

INVENTOR
Abraham R. Oliver
By Stoddart & Co.
Attorneys

United States Patent Office.

ABRAHAM R. OLIVER, OF WARREN, INDIANA, ASSIGNOR OF ONE-HALF TO JAMES E. CHRISTY, OF SAME PLACE.

OPERATING MECHANISM FOR SLIDING GATES.

SPECIFICATION forming part of Letters Patent No. 593,116, dated November 2, 1897.

Application filed March 12, 1897. Serial No. 627,197. (No model.)

*To all whom it may concern:*

Be it known that I, ABRAHAM R. OLIVER, a citizen of the United States, residing at Warren, in the county of Huntington and State of Indiana, having invented new and useful Improvements in Operating Mechanism for Sliding Gates, of which the following is a specification.

This invention relates to certain improvements in the adaptation of lever mechanism to sliding gates.

The object of my improvements is to enable gates of said class to be operated with the utmost ease from either side, the levers being so combined and connected with the gate as to effectually prevent its hanging on a "dead-center" or being stuck or jammed when in the inner or outer position, a feature common to all other devices of a like nature of which I have any knowledge.

Figure 1:
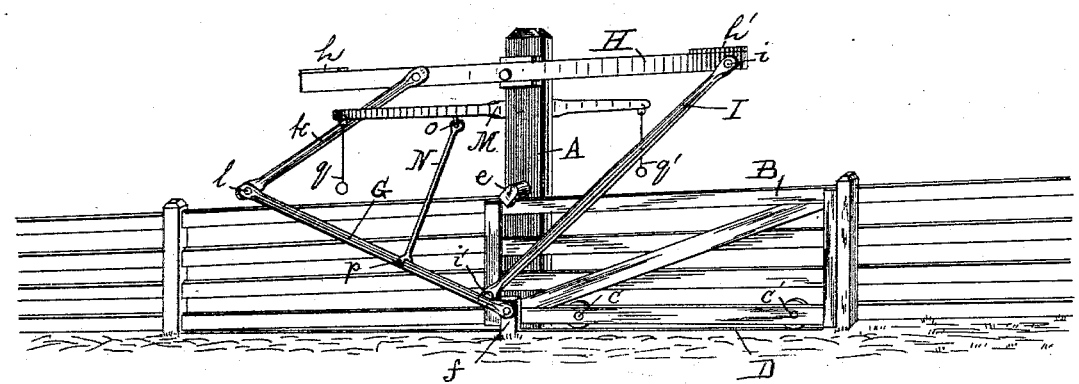
Figure 2:
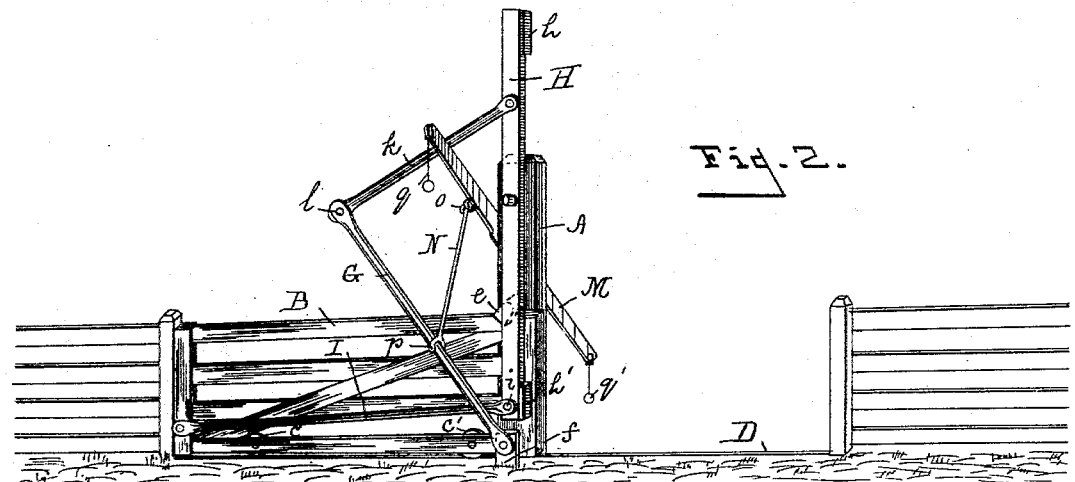

Referring to the accompanying drawings, Figure 1 represents a fence provided with my improved gate as when closed. Fig. 2 represents the fence with gate as when open.

The letter A designates a gate-post preferably rectangular in cross-section and having a projection aboveground equal to about one-half the length of the gate B.

The lower part of the gate is provided with rollers $c\ c'$, which are adapted to operate on a rail D, the gate being steadied in its upright position by an L-shaped pin which is driven into the gate-post, so as to form a guide, as shown at $e$.

In front of the gate-post A and gate B is a small post or stake $f$, to which one end of the lever G of the operating mechanism is pivoted, so that the said lever shall project rearward and in line with the gate-rail D.

Near the top of the post A and centrally pivoted thereto is a gate-lever H, the opposite ends of which are provided with weights or counterbalances $h\ h'$. One end of this lever is connected by a rod I and bolts or pins $i\ i'$ with the lower rear corner of the gate, while at a point midway between the opposite end of said lever and its fulcrum is pivotally connected the upper end of a rod $k$, the lower end of which is joined by a pin or bolt $l$ with the outer end of the lever G, as shown.

The length of the lever G should be about equal to that of the gate B and the rod $k$ should be about two-thirds the length of same.

The operating-lever M is centrally pivoted to the gate-post a short distance below the lever H and at a right angle thereto. This lever is connected by a rod N with the lever G, a universal coupling $o$ being used at the upper end of the rod N and a stirrup $p$ at the lower end thereof, as shown in both figures.

The outer ends of the operating-lever M are each provided with depending handles $q\ q'$, through the instrumentality of which the gate is operated.

Having described my invention, what I claim as new, and desire to secure by Letters Patent, is—

The combination in a guided and sliding gate, of a centrally-pivoted gate-lever, a rod connecting the front end of the gate-lever and the lower rear corner of the gate, the lever G pivoted in front of the gate-post, a rod and pivots connecting the outer end of the aforesaid lever G and the centrally-pivoted gate-lever, an operating-lever centrally pivoted at right angles to the gate-lever, depending handles at each end of the operating-lever, and a rod connecting the said lever and the rearwardly-projecting lever G, substantially as and for the purpose set forth.

In testimony whereof I affix my signature in presence of two witnesses.

ABRAHAM R. OLIVER.

Witnesses:
LEVI L. SIMONS,
ETHEL SIMONS.